United States Patent [19]
Kim

[11] Patent Number: 5,274,471
[45] Date of Patent: Dec. 28, 1993

[54] APPARATUS FOR CONVERTING RESOLUTION AND GRAY SCALE OF DOCUMENT IMAGE DATA

[75] Inventor: Eun-jin Kim, Seoul, Rep. of Korea

[73] Assignee: Samsung Electronics Co., Ltd., Kyunggi-do, Rep. of Korea

[21] Appl. No.: 799,065

[22] Filed: Nov. 27, 1991

[30] Foreign Application Priority Data

Nov. 28, 1990 [KR] Rep. of Korea ............... 90-19371
Oct. 31, 1991 [KR] Rep. of Korea ............... 91-19347

[51] Int. Cl.$^5$ ........................................ H04N 1/40
[52] U.S. Cl. ................................. 358/455; 345/147
[58] Field of Search ....................... 358/455–461, 358/465, 466; 382/50, 51; 340/793

[56] References Cited

U.S. PATENT DOCUMENTS

| | | | |
|---|---|---|---|
| 4,847,695 | 7/1989 | Arai | 358/458 |
| 4,870,499 | 9/1989 | Suzuki et al. | 358/465 |
| 5,111,194 | 5/1992 | Oneda | 358/456 |

Primary Examiner—Edward L. Coles, Sr.
Assistant Examiner—Jill Jackson
Attorney, Agent, or Firm—Rothwell, Figg, Ernst & Kurz

[57] ABSTRACT

An apparatus for converting a resolution and a gray scale of document image data, which includes a latch circuit for setting variable values of image control data, a resolution-converting clock generator for generating resolution-converting clock signals, a clock selector for selecting a pixel clock signal, a unit data detector for detecting byte detecting clock signal according to gray scale conversion as a unit data, an image data converter for gray scale conversion and binary codification of the image data, an image data selector for selecting the gray scale of the image data of the image data converter, and an image data output portion for outputting the image data with the selected gray scale in units of bytes. The image data processing can be performed at high speed, and the resolution and the gray scale control is carried out in the hardware, which allows the apparatus to be highly compatible and also to be widely adapted.

9 Claims, 9 Drawing Sheets

APPARATUS FOR CONVERTING RESOLUTION AND GRAY SCALE OF DOCUMENT IMAGE DATA

BACKGROUND OF THE INVENTION

The present invention relates to an apparatus for converting the resolution and gray scale of document image data, and particularly to an apparatus which is capable of converting the resolution and gray scale of input image data to be suitable for diverse functions of document image input/output apparatus such as an image scanner, a facsimile, a digital copier, and the like.

Resolution and gray scale are important factors in determining the image quality in document image handling apparatus such as image scanners, facsimiles, digital copiers, etc. In a conventional document image input/output apparatus such as these, the resolution is represented by the unit of dots per inch (dpi) which indicates how many pixels can be displayed per inch, and the gray scale determines the degrees of brightness for each pixel. The gray scale is determined by the number of data bits per pixel. When there is 1 bit per pixel, the gray scale has two tones of black and white; for 4-bit data, there are 16 graduations of brightness; and for 8-bit, 256 gradations. However, for a pseudo half-tone (dithering), the tone undergoes a pseudo-expansion of an area gray scale, even though it is 1 bit per pixel.

Generally, higher resolution and higher gray scale obtain an image data of good quality. To attain either of these, the number of data bits must become larger. Thus, it is increasingly necessary to vary the resolution and/or the gray scale in accordance with the purpose for which the image data is used as well as to vary the characteristics of the apparatus which handles the data.

For example, a document image may be inputted using an image scanner and the input image is outputted by a printer such as a laser beam printer or the like, which printer can represent just two tones (black and white) per pixel. In this case, the gray scale must be 1 bit per pixel, i.e., two tones (0 or 1), while the resolution varies from 180 dpi to 240 dpi, 300 dpi, 400 dpi or more depending on the printer's performance. Therefore, the image scanner may read an image resolution which equals the output resolution of the printer.

On the other hand, when the input image from an image scanner is outputted to a graphic monitor, the resolution of the graphic monitor is 1,000 pixels or thereabouts per line, and the gray scale varies as 2 tones, 16 halftones, or 256 halftones, etc. As a result, in the above-stated case, the image data is received and outputted under conditions where the resolution and gray scale correspond to those of the monitor.

In a document image input device including the image scanner, the limited performances of the conventional related apparatus such as the laser printer and monitor, merely adopt several modes of the resolution and gray scale and accordingly it is comparatively easy to process the interfacing data. However, with the trend towards diverse system functions and related apparatus, as well as various subdivisions of the uses for the image data, it becomes necessary to control the resolution and gray scale by a series of steps, In addition, the resolution and gray scale have been controlled using software, but the amount of document image data is too voluminous, thus requiring too much processing time and the resolution and the gray scale are not converted at the same time, thereby requiring complicated processing steps which degrade the system's efficiency.

SUMMARY OF THE INVENTION

Therefore, the present invention is devised to solve the above problems. It is an object of the present invention to provide an apparatus for converting a resolution and a gray scale of document image data for obtaining an image data that adapts to the characteristics and performances of various output apparatus such as a printer, a facsimile, a graphic monitor, or the like, wherein the resolution and the gray scale conversions of the input image data are carried out directly in an input device so as to match the characteristics of the related output apparatus.

To achieve these and other objects, there is provided an apparatus for converting a resolution and gray scale of document image data comprising:

a latch portion for setting variable values to receive and convert image control data input into image control data having a desired resolution and gray scale;

a resolution-converting clock generator for generating resolution-converting clock signals to convert the resolution of the image control data of which variable values are set in the latch portion, in accordance with a master clock signal corresponding to the input speed of the image control data;

a clock selector for selecting a pixel clock signal suitable for the operational mode and sequence of the image control data that is input from the latch portion among the clock signals transmitted from the resolution-converting clock generator, in accordance with a master clock signal corresponding to the input speed of the image control data;

a unit data detector for counting the pixel clock pulses transmitted from the clock selector and for detecting the output control signal in units of bytes in accordance with the gray scale conversion;

an image data converter for gray scale conversion and binary codification of the image data input in accordance with the pixel clock signal transmitted from the clock selector;

an image data selector for selecting the gray scale of the image data in accordance with the control data set in the latch portion and the byte-detection clock signal from said unit data detector; and an image data output portion for outputting in units of bytes the resolution and gray scale-converted image data which is enabled by the image data gray scale selecting signal selected in the image data selector, in accordance with the pixel clock signal supplied from the clock selector.

BRIEF DESCRIPTION OF THE DRAWINGS

Other objects and advantages of the present invention will become more apparent by the following description with reference to accompanying drawings, in which.

DETAILED DESCRIPTION OF THE INVENTION

An apparatus for converting a resolution and a gray scale shown in FIG. 1 will be described below in detail with reference to the related drawings.

Figure 1:
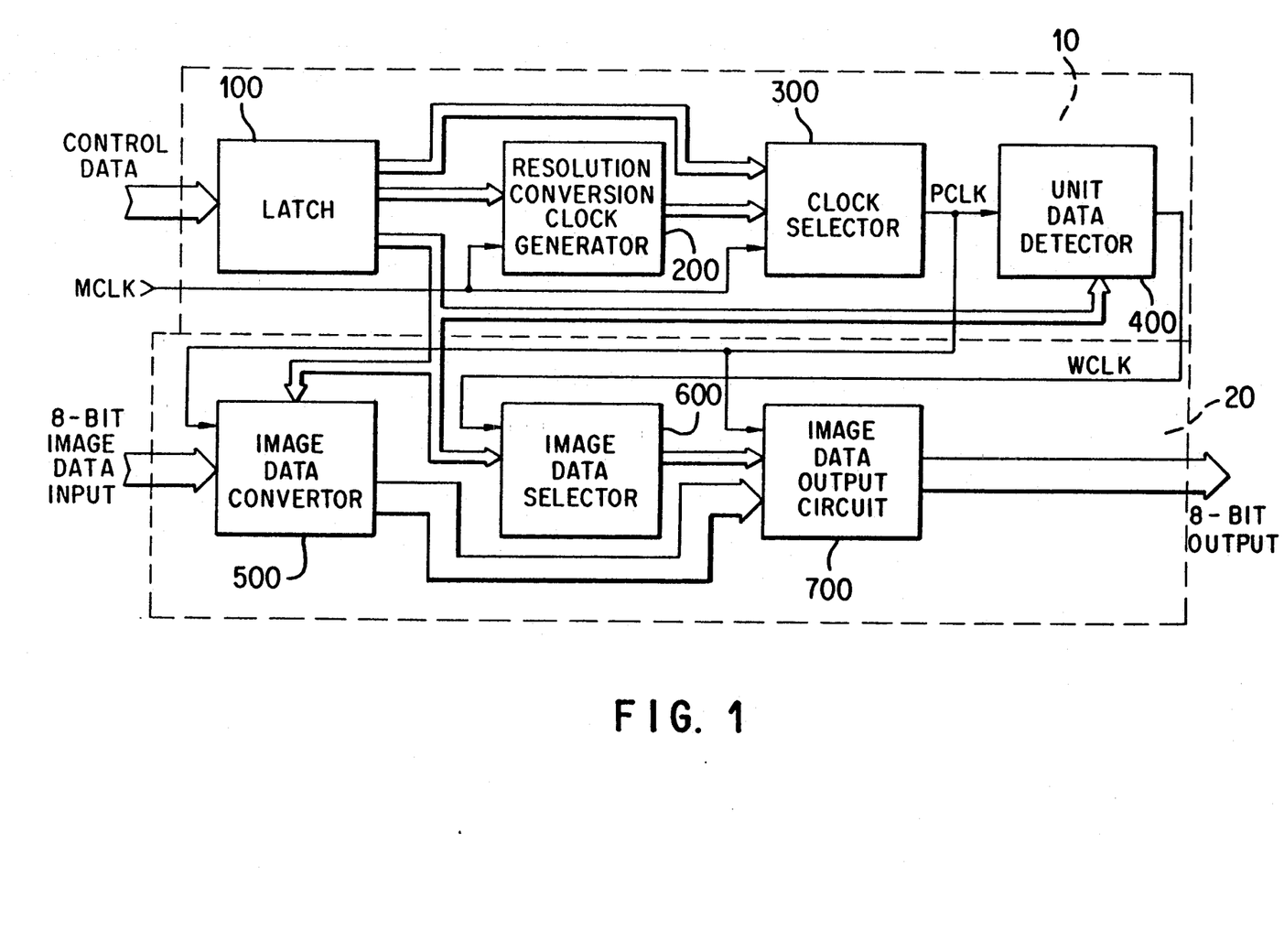
FIG. 1 is a block diagram of an apparatus for converting a resolution and gray scale of a document image data according to the present invention.

Referring to FIG. 1, the resolution and gray scale conversion apparatus of the document image data according to the present invention comprises, broadly speaking, a control signal generator 10 for generating control signals to convert the actual image data, and an image data processor 20 for converting the actual image data according to the control signals. The control signal generator 10 comprises a latch circuit 100, a resolution-converting clock generator 200, a clock selector 300 and a unit data detector 400. The control signal generator 10 generates the control signals for converting the resolution and the gray scale of the actual image data. In the image data processor 20, the input image data is converted and outputted according to the control signals supplied from control signal generator 10 and includes an image data converter 500, an image data selector 600 and an image data output circuit 700.

Figure 3:
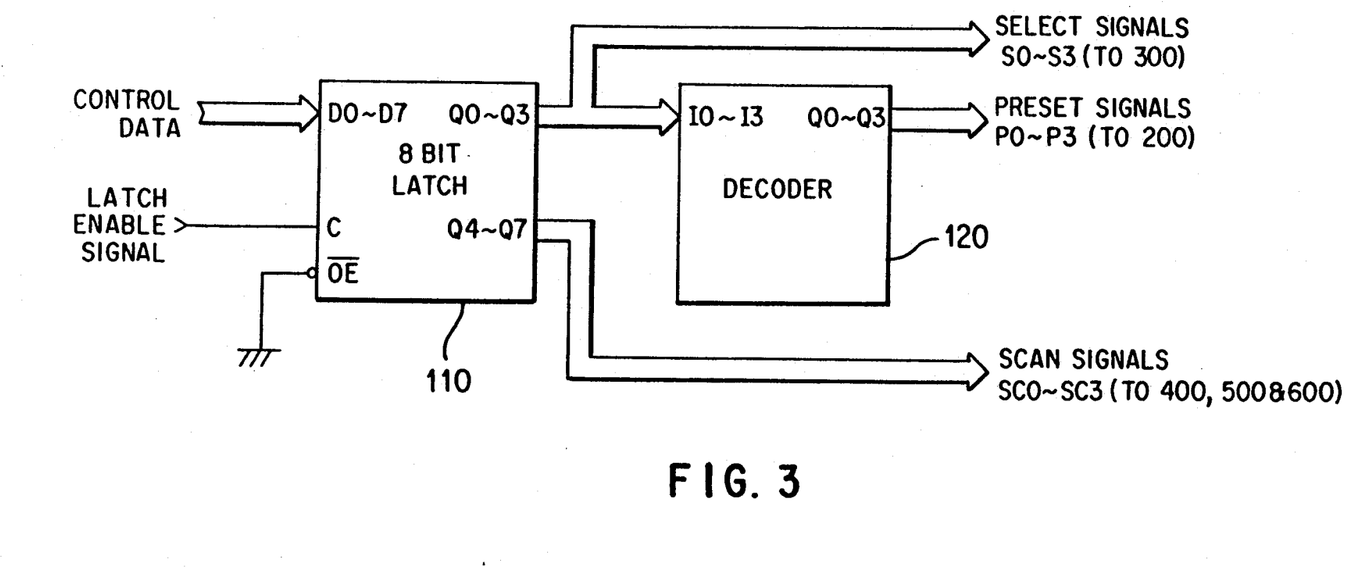
FIG. 3 is a detailed circuit diagram of the latch shown in FIG. 1.

Referring first to FIG. 3, the latch circuit 100 of FIG. 1 includes an 8-bit latch 110 and a decoder 120. The 8-bit latch 110 receives the image control data CD0-CD7 and stores it when an external latch enable signal goes high, which sets the variable values. The 8-bit latch 110 supplies 4-bit selection signals S0-S3 among the stored image control data to decoder 120, and simultaneously to clock selector 300. The decoder 120 decodes the 4-bit variable values of the image control data CD0-CD7 which were temporarily stored in 8-bit latch 110, then outputs preset signals P0-P3.

Figure 4:
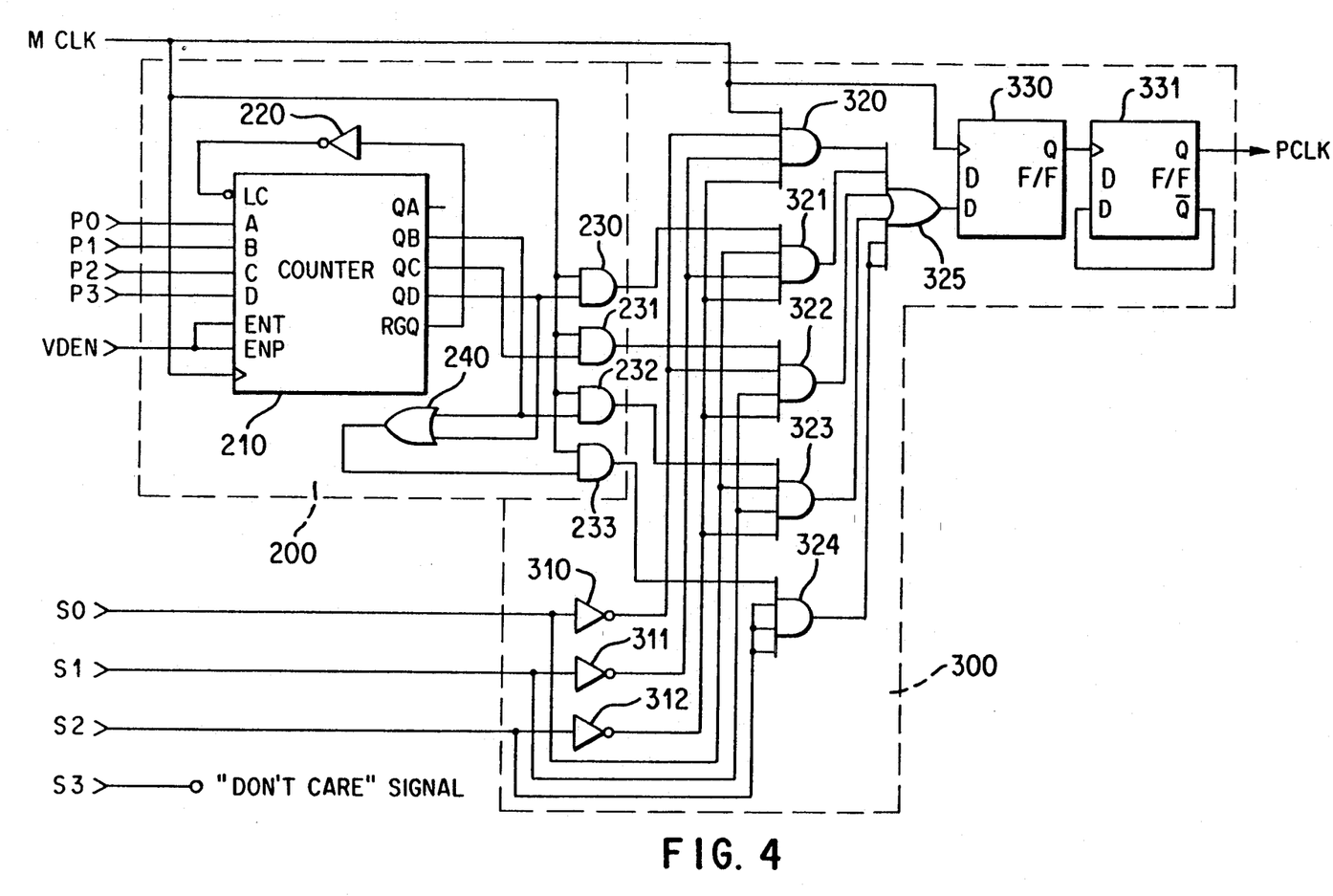
FIG. 4 is a detailed circuit diagram of the resolution-converting clock generator and the clock selector shown in FIG. 1.

Referring to FIG. 4, the resolution-converting clock generator 200 includes a counter 210, an inverter 220, AND gates 230-233, and an OR gate 240, and receives a valid data enable signal VDEN, and preset signals P0-P3 supplied from the decoder 120 of latch circuit 100 according to master clock signal MCLK, thereby generating resolution-converting clock signals for the clock selector 300. Clock selector 300 is formed by inverters 310-312, AND gates 320-324, an OR gate 325, and D flip-flops 330 and 331, and performs a logical combination of master clock signal MCLK, the clock signals outputted from the AND gates 230-233 of resolution-converting clock generator 200, select signals S0, S1 and S2 supplied from latch circuit 100 and the inverted select signals from inverters 310-312, thereby producing a pixel clock signal PCLK that corresponds to the mode and sequence of the image control data operation.

Figure 5:
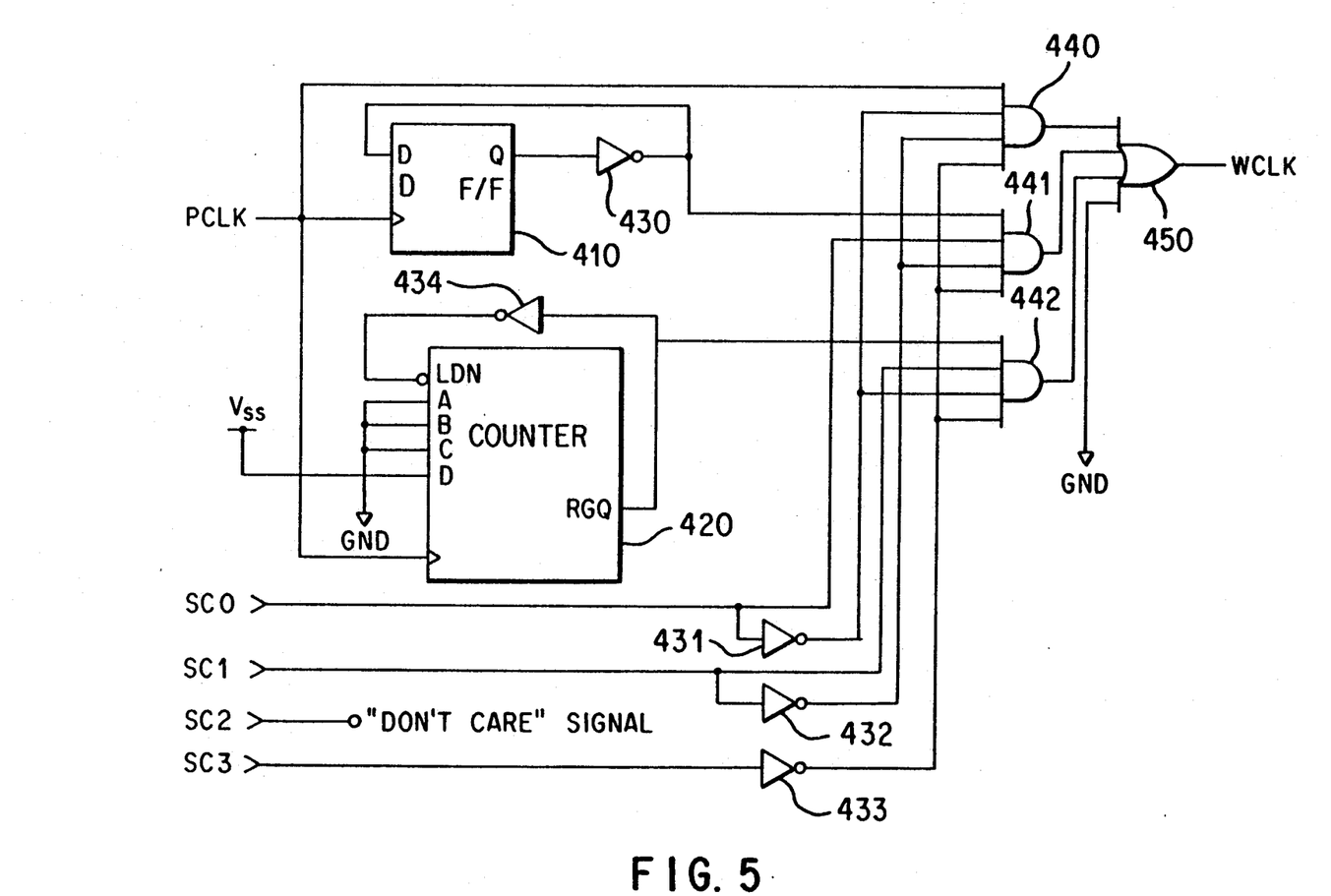
FIG. 5 is a detailed circuit diagram of the unit data detector shown in FIG. 1.

In FIG. 5, the unit data detector 400 comprises a D flip-flop 410, a counter 420, inverters 430-433, AND gates 440, 441 and 442, and an OR gate 450. Unit data detector 400 counts the pixel clock signal PCLK supplied from the D flip-flop 331 within the clock selector 300 to produce a byte detecting clock signal WCLK in units of bytes according to the gray scale conversion.

Figure 6:
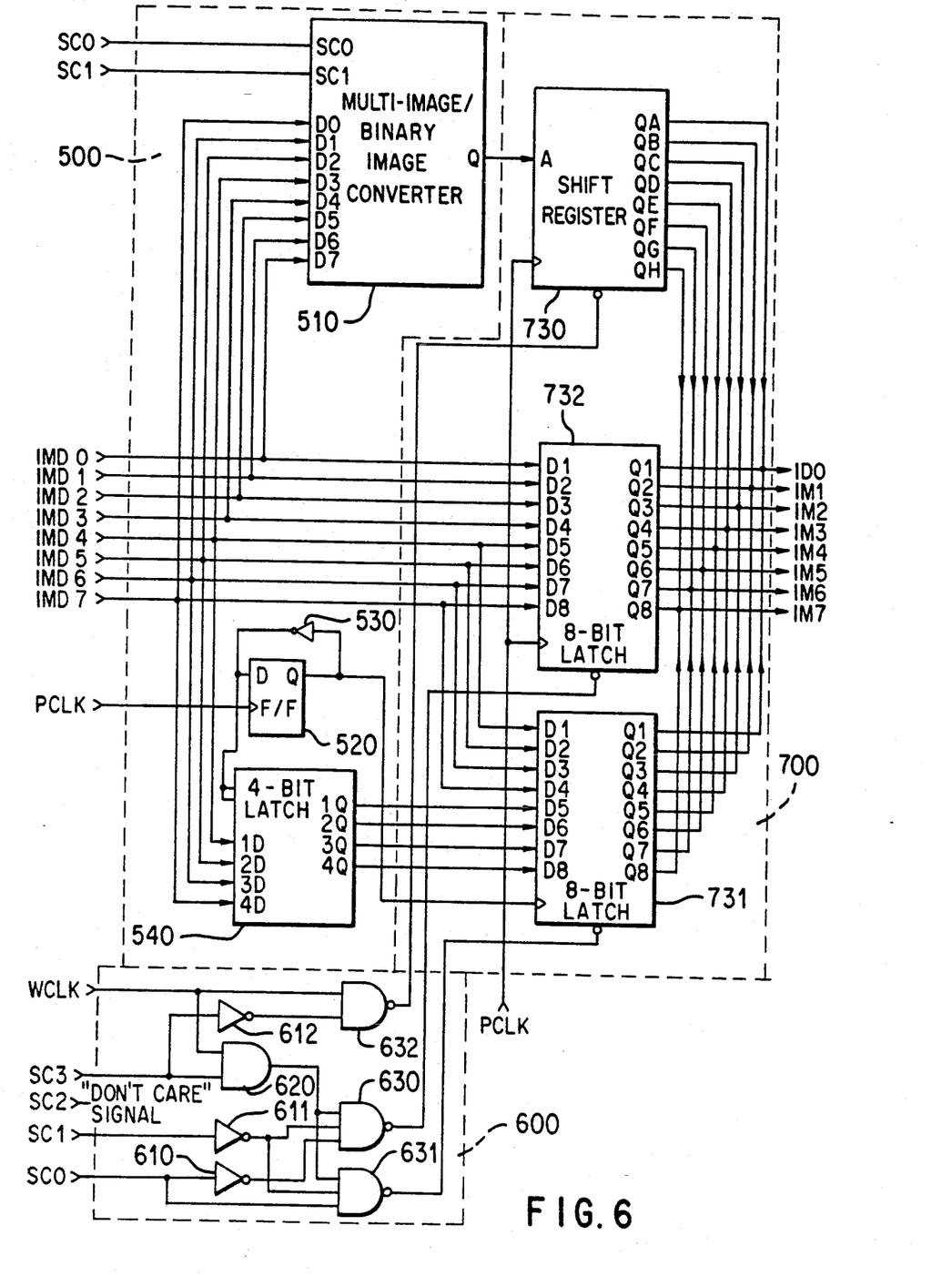
FIG. 6 is a detailed circuit diagram of the image data converter, the image data selector, and the image data output circuit shown in FIG. 1.

In FIG. 6, the image data converter 500 includes a multiple image-to-binary-image converter 510, a D flip-flop 520, an inverter 530, and a 4-bit latch 540, and performs the gray scale conversion and binary processing of the image data input in accordance with the pixel clock signal PCLK that is transmitted from the clock selector 300. Image data selector 600 includes inverters 610, 611 and 612, an AND gate 620, and NAND gates 630, 631 and 632, and selects the gray scale of the image data which is outputted from the image data converter 500 by supplying an output enable signal to the image data output portion 700, in accordance with scan signals SC0-SC3 transmitted from the 8-bit latch 110 of the latch circuit 100 and the byte detecting clock signal WCLK supplied from the unit data detector 400. Image data output portion 700 has a shift register 730, and 8-bit latches 731 and 732 for outputting in units of bytes image data by being enabled according to the selected gray scale signal selected from image data selector 600 and performing the resolution and gray scale conversion according to the pixel clock signal PCLK supplied from clock selector 300.

The operation of the present invention having the above-described construction will now be presented in detail.

Referring to FIG. 1, an embodiment of the present invention will be explained by assuming that the gray scale of image data IMD0-IMD7 inputted to image data converter 500 is 256 and its resolution is 300 dpi, that is, the document image data is 8 bits per pixel. Therefore, the resolution is converted to 300 dpi, 240 dpi, 200 dpi, 180 dpi, and 75 dpi, and for each resolution, the gray scale can be processed by 8 bits per pixel (256 half tone gray scale), 4 bits per pixel (16 half tone gray scale), and 1 bit per pixel (simple binary codification, or dithering).

The latch circuit 100 sets the variable values corresponding to the desired resolution and gray scale to convert the original document image data IMD-0-IMD7 inputted to the image data converter 500 into the output image data IM0-IM7 having desired resolution and gray scale. When the latch enable signal applied to 8-bit latch 110 is a logic high, the 8-bit latch 110 of latch circuit 100 (FIG. 3) receives control data CD0-CD7 to store the variable values which convert the resolutions to 300 dpi, 240 dpi, 200 dpi, 180 dpi, and 75 dpi, and indicate the gray scale such as 8 bits per pixel, 4 bits per pixel, simple binary data, or pseudo half-tone (dithering).

Figure 2:
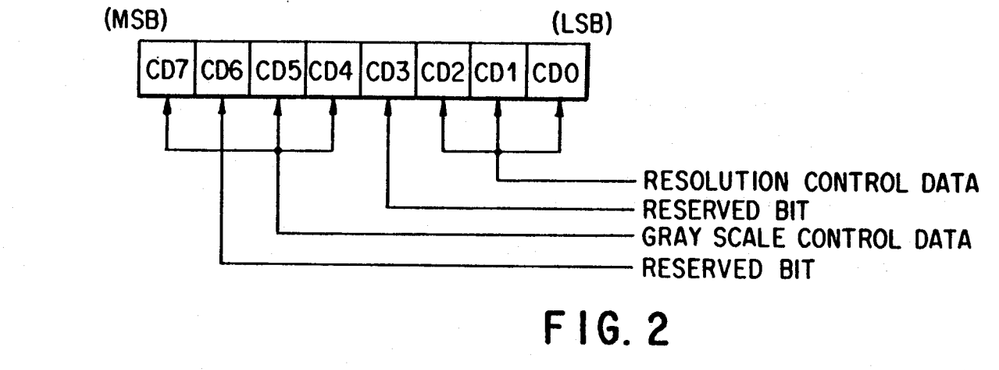
FIG. 2 shows the format of the control data of the latch shown in FIG. 1.

The format of control data CD0-CD7 is illustrated in FIG. 2, and composed of resolution control codes CD0–CD2, gray scale control codes CD4–CD6, and reserved codes CD3 and CD7.

In the embodiment illustrated in FIGS. 2 and 3, the resolution control and gray scale control codes are restricted to a 1-byte representation. However, in practical application, the steps for controlling the resolution and gray scale can be increased by dividing the control step for the resolution and gray scale control codes of the control data into two separate latches. This embodiment of the present invention is described by limiting the resolution levels to 5 levels, i.e., 300 dpi, 240 dpi, 200 dpi, 180 dpi, and 75 dpi, and thus, the resolution control code is set to 3 bits. Also, since the processing mode of the gray scale control code is limited to 4 modes which are 8 bits per pixel, 4 bits per pixel, simple binary, and pseudo half-tone processing, the gray scale control code is set to 3 bits. That is, the resolution can be set to a 1-byte code to expand the resolution control to 256 levels and, in a similar way, the gray scale control can be expanded to a 1-byte code.

With corresponding codes set as shown in the following [Table 1] and [Table 2], 8-bit latch 110 of latch circuit 100 outputs the resolution control codes to decoder 120 and clock selector 300 through outputs Q0–Q3 as signals S0–S3, and outputs the gray scale control codes to unit data detector 400 and image data selector 600 through outputs Q4–Q7 as scan signals SC0–SC3.

TABLE 1

| resolution | CD3 | CD2 | CD1 | CD0 |
|---|---|---|---|---|
| 300dpi | R | 0 | 0 | 0 |
| 240dpi | R | 0 | 0 | 1 |
| 200dpi | R | 0 | 1 | 0 |
| 180dpi | R | 0 | 1 | 1 |
| 75dpi | R | 1 | 0 | 0 |
| reserved code | R | 1 | 0 | 1 |
| reserved code | R | 1 | 1 | 0 |
| reserved code | R | 1 | 1 | 1 |

TABLE 2

| gray scale | CD7 | CD6 | CD5 | CD4 |
|---|---|---|---|---|
| 8 bits/pixel | 0 | R | 0 | 0 |
| 4 bits/pixel | 0 | R | 0 | 1 |
| reserved code | 0 | R | 1 | 0 |
| reserved code | 0 | R | 1 | 1 |
| simple binary | 1 | R | 0 | 0 |
| dithering | 1 | R | 0 | 1 |
| reserved code | 1 | R | 1 | 0 |
| reserved code | 1 | R | 1 | 1 |

In the foregoing [Table 1] and [Table 2], the CD3 and CD6 bits designated by "R" are reserved bits for expanding the resolution control code and will become "don't care" states.

FIG. 4 illustrates the resolution-converting clock generator 200 and the clock selector 300, and the operations of the circuits are determined by receiving the output signals from the 8-bit latch 110 and decoder 120 shown in FIG. 3.

A master clock MCLK shown in FIG. 4 is a clock signal having twice the frequency as the pixel data clock signal output from an image sensor (not shown herein), and a 50% duty cycle. In addition, a valid data enable signal VDEN dictates the start and the end of effective data, and represents the period that the image sensor starts to read and outputs data of one actual line. The preset signals P0–P3 inputted to the resolution-converting clock generator 200 are the preset values of the decoder 120, and the signals P0–P3 determines the period of the counter 210 by being outputted from the decoder 120 illustrated in FIG. 3. The output of decoder 120 is determined by the following equation, wherein the preset value to the output resolution of the image sensor is written as:

$$\text{preset value} = \frac{SR \times 2}{G.C.M.\ (SR,\ WR)} \quad \text{<equation 1>}$$

where, SR = image sensor output resolution
WR = desired resolution (obtained by converting the output resolution), and
G.C.M. = greatest common measure.

Accordingly, when the output resolution of the image sensor is 300 dpi, the preset value for converting the output resolution to 240 dpi is as follows:

$$\text{preset value} = \frac{300 \times 2}{G.C.M.\ (300,\ 240)} = \frac{300 \times 2}{60} = 10$$

Therefore, to convert the resolution of the image from 300 dpi into 240 dpi, the preset value applied to the counter 210 of the resolution-converting clock generator 200 is set to 10 as described above, thereby operating the counter as a binary counter of which counter period is 10.

When the operating period of the counter is determined by setting the preset value applied to the counter 210 shown in FIG. 4 according to equation 1, master clock MCLK applied to the counter 210 selects certain clock pulses per individual period of equation 1, converting the resolution. The following equation 2 represents the number of the clock pulses to be selected per period of equation 1 in accordance with the resolution which will be converted.

$$\text{number of the clock pulses to be selected} = \frac{WR \times 2}{G.C.M.\ (SR,\ WR)} \quad \text{<equation 2>}$$

In the meantime, the selection of clock pulses which is represented by equation 2 per individual clock period designated by equation 1 for converting the resolution, may result in a similar effect when several clock pulses are removed per each clock period of equation 1. Accordingly, the numbers of the clock pulses to be eliminated per period of equation 1 for converting resolution can be obtained by subtracting the equation 2 from equation 1. That is, the number of the clock pulses to be eliminated per period of equation 1 is obtained as the following equation 3.

$$\text{number of the clock pulses to be eliminated} = \frac{(SR - WR) \times 2}{G.C.M.\ (SR,\ WR)} \quad \text{<equation 3>}$$

When the outputted resolution of the image sensor is converted from 300 dpi to 240 dpi, the number of pixels to be eliminated are two per ten pixels output from the image sensor by the foregoing equation 3.

As stated above, if one output pixel from the image sensor is regularly eliminated for every 5 pixels, a 300 dpi image can be converted in to 240 dpi.

To determine the number of clock pulses to be eliminated for converting the resolution as shown in the foregoing equation 3, the output value of the counter 210 must be logically combined. Here, one input of each of AND gates 230-233 is supplied with the output value transmitted from each terminal QD, QC and QB of counter 210 to convert a 300 dpi resolution into 240 dpi, 200 dpi, 180 dpi, and 75 dpi.

On the other hand, the clock selector 300 illustrated in FIG. 4 is a circuit which selects the clock signal from the resolution-converting clock generator 200 in accordance with the signals S0-S3 supplied from the 8-bit latch 110 of the latch circuit 100 shown in FIG, 3. Here, the values of signals S0-S3 are based on the gray scale control code CD0~CD3 designated in [Table 1].

As described above, to determine the converted pixel clock ratio by selecting the clock signal converted in the resolution-converting clock generator 200, the clock signal passes through the logic circuit of clock selector 300 composed of inverters 310-312, the AND gates 320-324, the OR gate 325, and the flip-flops 330 and 331. At this time, the D flip-flop 331 included in the clock selector 300 shown in FIG. 4 is a divide-by-2 which supplies the pixel clock signal PCLK to the unit data detector 400, the image data converter 500, and the image data output portion 700. Here, the pixel clock signal PCLK shows the ratio of the converted pixel clock signal.

FIG. 5 illustrates an embodiment of the unit data detector 400 which detects the pixel data processed in units of bytes and in accordance with diverse scanning modes, and generates a byte detecting signal in accordance with the pixel clock signal PCLK output from the D flip-flop 331. In unit data detector 400, AND gate 440 is a logic device which outputs 8-bits-per-pixel data, while AND gate 441 is a logic device which, through the D flip-flop 410, divides the pixel clock signal PCLK by two in order to output 4-bits-per-pixel data, and AND gate 442 is a logic device which determines binary images of a simple binary tone or pseudo half-tone on the receipt of the carry signal having the counting period of 8 and transmitted from the binary counter 420.

At this time, the byte detecting clock signal WCLK is selected through a logic device, i.e., OR gate 450, and the outputs of the AND gates 440, 441, and 442 supplied to the input of the OR gate 450 are obtained by the logic product of the gray scale control codes SC0-SC3, the pixel clock signal PCLK, the pixel clock signal divided by two, and the carry signal supplied from the binary counter 420.

On the other hand, FIG. 6 illustrates a detailed construction of the image data converter 500, the image data selector 600, and the image data output circuit 700. These operate upon receipt of pixel control signal PCLK output from clock selector 300 in FIG. 4, byte detecting clock signal WCLK output from unit data detector 400 in FIG. 5, and the gray scale control codes are based on the <Table 2>.

In FIG. 6, multiple image/binary image converter 510 of image data converter 500 performs binary processing of the digital 8-bit image data, thereby carrying out simple binary codification of pseudo half-tone processes. The shift register 730 of the image data output portion 700 receives the binary data in series supplied from the multiple image to binary image converter 510, and then converts the inputs into parallel, i.e., 8-bit data. The 8-bit latch 732 of the image data output circuit 700 bypasses the image converter 810 during the processing of the 8-bit pixel data. The 4-bit latch 540 extracts only the upper 4 bits from the inputted image during processing 4 bit-pixel data. The upper 4 bits of the image data is latched when D flip-flop 520 which divides the pixel clock by two, causes the first pixel clock pulse PCLK to go "high". Also, when the second pixel clock pulse PCLK goes "high", the data latched in 4-bit latch 540 is latched again as the upper 4 bits of 8-bit latch 731. The upper 4-bit data IMD4-IMD7 among the input image data are also latched as the lower 4 bits of the 8-bit latch 731, thereby creating one byte of data.

On the other hand, the image data selector 600 illustrated in FIG. 6 controls the operation of the image data output portion 700 by the gray scale control codes based on the [Table 2]. Also, image data selector 600 exclusively controls the output control signals of shift register 730 and 8-bit latches 731 and 732, to prevent the data from colliding when transmitting the processed data to output terminals IM0-IM7 of image data output portion 700, so that the output terminals with other gray scales maintain high impedance states when a specific gray scale is selected.

Figure 7:
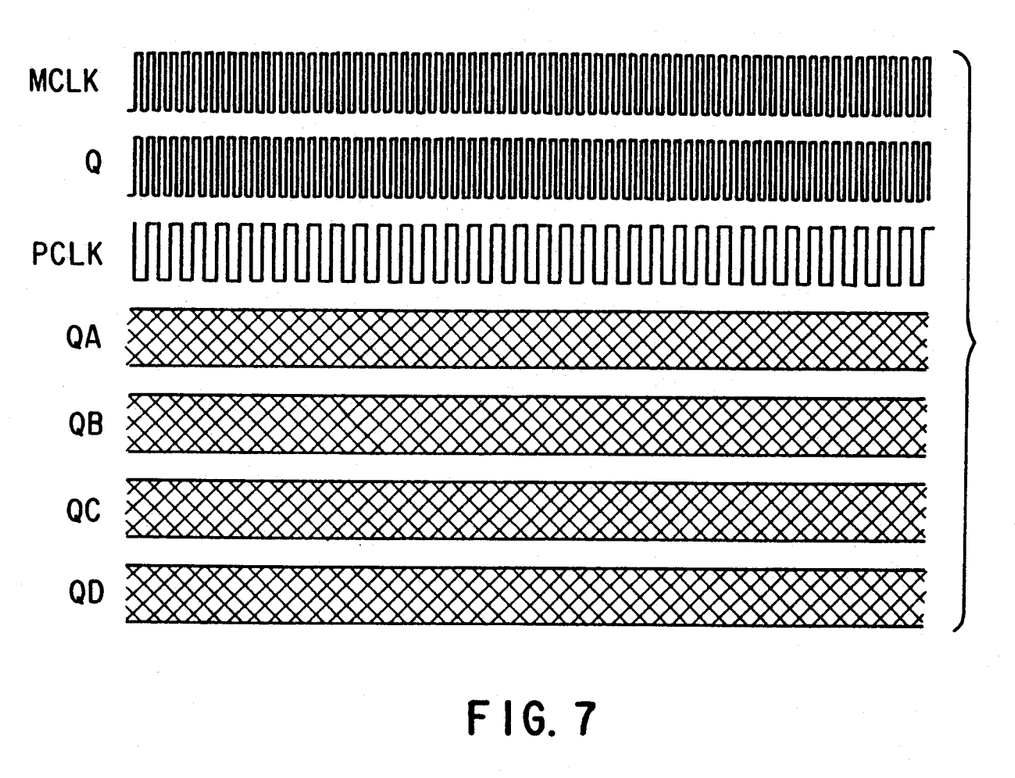
FIG. 7 is a waveform diagram showing the case when the resolution of the image data according to FIG. 1 is 300 dpi.

FIG. 7 is a waveform diagram of the resolution-converting clock generator 200 of FIG. 4 when it converts and processes a resolution of the image data into 300 dpi. In accordance with the resolution control codes shown in [Table 1], each hit of select signals S0-S3 becomes "0", and the clock signal MCLK having a frequency twice that of the pixel clock signal is sampled again in D flip-flop 330 via AND gate 320 and OR gate 325 of clock selector 300. This generates a pixel clock signal PCLK which is divided by two in the D flip-flop 331 as shown in FIG. 7.

At this time, the preset values P0-P3 and the output values QA, QB, QC, and QD in the counter 210 of the resolution-converting clock generator 200 become "don't care" state by selective logic as illustrated in the oblique-lined portions in FIG. 7. As described above, when image data having a 300 dpi resolution is input to image data converter 500, all the pixel's data are selected without omission.

Figure 8:
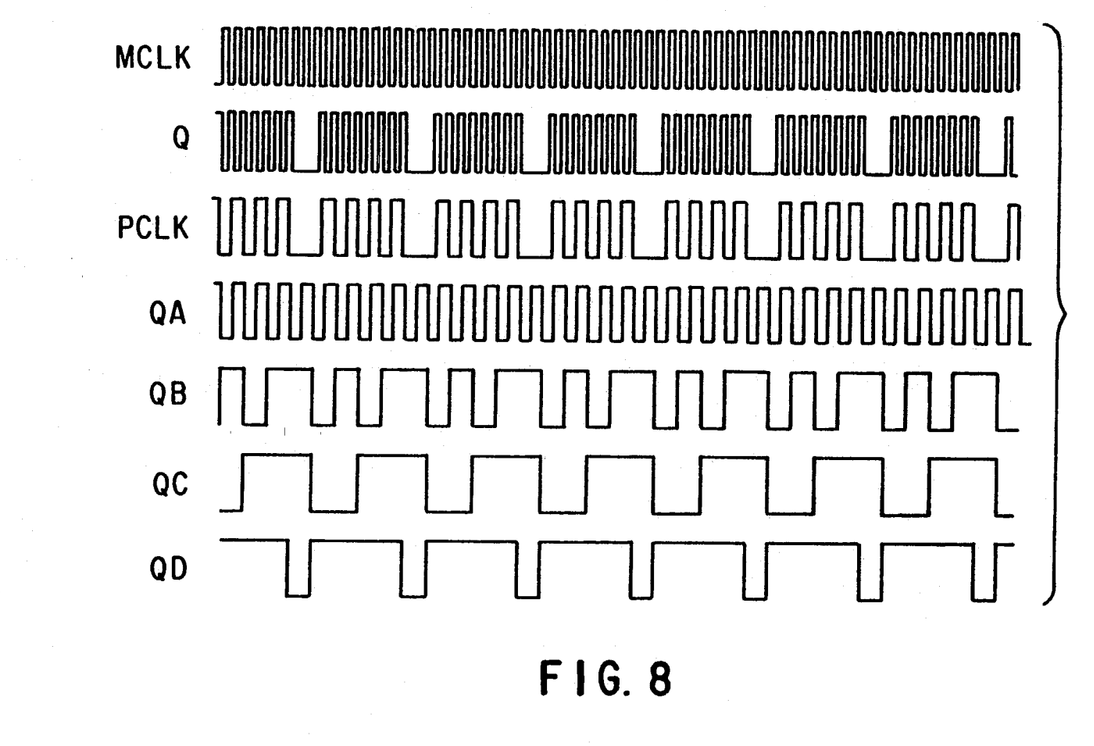
FIG. 8 is a waveform diagram showing the case when the resolution of the image data according to FIG. 1 is 240 dpi.

Meanwhile, to convert the reference resolution of image data input from a 300 dpi image sensor into 240 dpi, the preset value is calculated by <equation 1> and the preset value is loaded as the respective bits of the preset values P0-P3 of the counter 210 by setting the period of the counter to 10. At this time, if the selecting signals S0-S3 are fixed by the code values corresponding to 240 dpi of <Table 2>, the output QD and the master clock signal MCLK of the counter 210 is logically multiplied in the AND gate 230 as the waveforms show in FIG. 8. Then, the output signal of the AND gate 230 is sampled again in the D flip-flop 330, and divided again by two through the D flip-flop 331. The signal divided by two in the D flip-flop 331 is the signal for controlling the resolution of 240 dpi. That is, to convert the image data input from the image sensor from 300 dpi into 240 dpi, the image data can be obtained by eliminating any one among five output clock signals of the image data.

Figure 9:
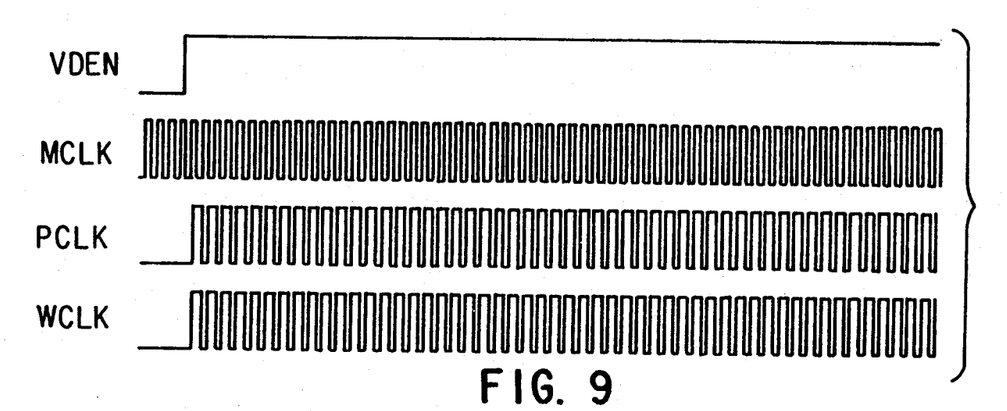
FIG. 9 is a waveform diagram of the unit data detector showing the case when the resolution of the image data according to FIG. 1 is 300 dpi and its gray scale is 256 half tones.

FIG. 9 is a waveform diagram by which 1-byte data is detected to be suitable for supplying and processing the pixel data of the unit data detector 400 shown in FIG. 5, when the image data having a resolution of 300 dpi is input to the image data converter 500 by 8 bits per pixel.

As the waveform shown in FIG. 9, the pixel clock signal PCLK supplied from the clock generator 300 is passed through the AND gate 440 and OR gate 450 in the unit data detector 400 in accordance with the gray scale control codes in [Table 2], thereby obtaining the byte-detecting clock signal WCLK.

Figure 10:
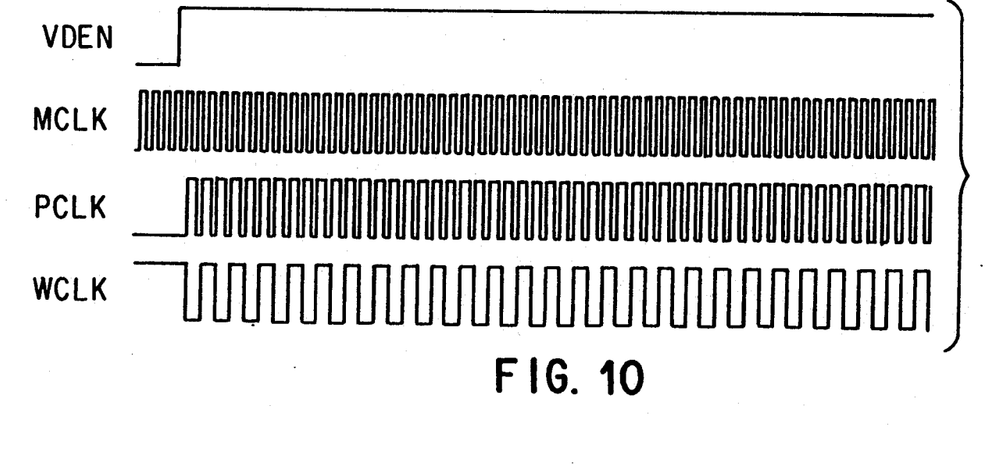
FIG. 10 is a waveform diagram of the unit data detector showing the case when the resolution of the image data according to FIG. 1 is 300 dpi and its gray scale is 16 half tones and FIG. 11 is a waveform diagram of the unit data detector during the processing of binary data, for the case when the resolution of the image data according to FIG. 1 is 300 dpi.

FIG. 10 is a waveform diagram of the unit data detector 400 when the image data resolution is 300 dpi and its gray scale is 16, i.e., 4 bits per pixel.

As illustrated in FIG. 10, when the image is processed with a gray scale of 16, that is, the data is 4 bits per each pixel, 4-bit data is transmitted whenever the pixel clock signal PCLK goes "high". At this time, the D flip-flop 410 in FIG. 5 divides the PCLK signal by two to produce WCLK as shown in FIG. 10, from AND gate 441, and then latch 731 outputs 1 byte of data for every two input periods of pixel clock signal PCLK.

Figure 11:
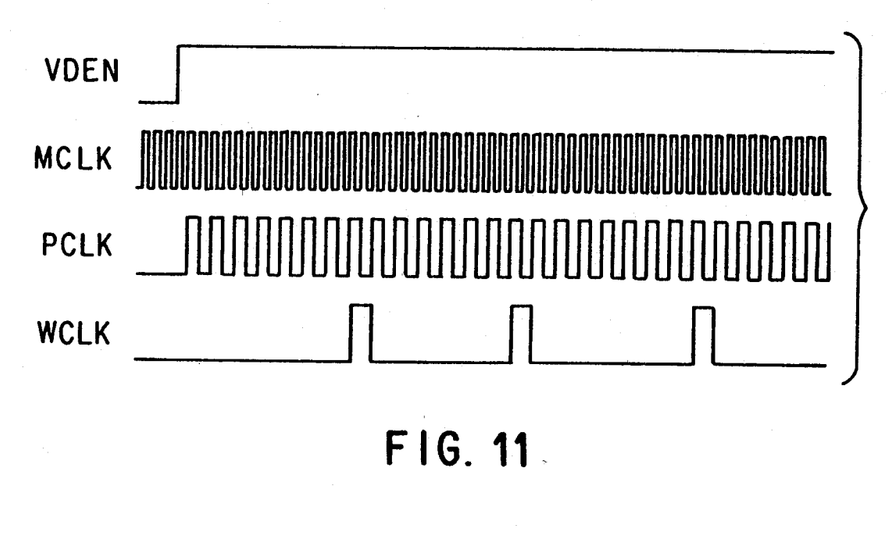

FIG. 11 is a waveform diagram of the unit data detector 400 during processing the binary image data with a resolution of 300 dpi.

Referring to FIG. 11, in case of processing a binary image such as a simple binary image or a pseudo halftone image, since one bit is generated whenever the pixel clock signal PCLK goes "high", the byte detecting clock signal WCLK is output every time when the carry signal occurs in the counter 420, in other words, once for every 8 PCLK pulses, to transmit the data one byte at a time.

According to the present invention, the resolution and gray scale can be controlled by the image data corresponding to the utilizing purposes of the image data and the performance and characteristics of the related output apparatus as described above, which enables high-speed data processing. Further, since resolution and gray scale control is carried out in the hardware, the apparatus is highly compatible and can be widely adapted.

What is claimed is:

1. An apparatus for converting a resolution and a gray scale of document image data comprising:
    a latch portion for receiving and converting image control data input into image resolution control data representing a desired resolution and image gray scale control data representing a desired gray scale;
    a resolution-converting clock generator for generating resolution-converting clock signals to convert the resolution of said document image data in accordance with a master clock signal corresponding to a transmission rate of said document image data and said image resolution control data;
    a clock selector for selecting a pixel clock signal from among the resolution-converting clock signals generated by said resolution-converting clock generator, in accordance with said master clock signal and said image resolution control data;
    a unit data detector for counting pixel clock pulses transmitted from said clock selector, for detecting byte units of document image data in accordance with said image gray scale control data, and for producing a byte-detection clock signal corresponding thereto;
    an image data converter for gray scale conversion and binary codification of said document image data in accordance with the pixel clock signal transmitted from said clock selector;
    an image data selector for selecting the gray scale of said document image data from said image data converter in accordance with said image gray scale control data and said byte-detection clock signal from said unit data detector; and
    an image data output circuit for outputting in units of bytes the resolution and gray scale-converted image data selected by said image data selector, in accordance with said pixel clock signal supplied from said clock selector.

2. An apparatus for converting a resolution and a gray scale of document image data as claimed in claim 1, wherein said latch portion comprises:
    an 8-bit latch for storing said image control data at the moment when an external latch enable signal goes "high", and setting and outputting said image resolution and gray scale control data; and
    a decoder for decoding and outputting preset clock signals corresponding to the resolution control data that are temporarily stored in said 8-bit latch, to said resolution-converting clock generator.

3. An apparatus for converting a resolution and a gray scale of document image data as claimed in claim 1, wherein said resolution-converting clock generator comprises:
    a counter and an inverter interconnected for counting said master clock signal in accordance with a valid data enable signal and preset signal set and supplied from said latch portion;
    first to fourth AND gates for generating predetermined resolution-converting clock signals on the receipt of any one signal selected among the output signals of said counter and said master clock signal; and
    an OR gate for selectively receiving outputs of said first to fourth AND gates and outputting said received outputs at an output terminal thereof.

4. An apparatus for converting a resolution and a gray scale of document image data as claimed in claim 3, wherein said clock selector comprises:
    first, second, and third inverters, fifth through ninth AND gates, and an OR gate, which combine clock signals output from said first through fourth AND gates of said resolution-converting clock generator with said select signals supplied from said latch portion; and
    first and second D flip-flops which receive the output of said OR gate and select a pixel clock signal corresponding to the operational mode and sequence of document image data according to the master clock signal.

5. An apparatus for converting a resolution and a gray scale of document image data as claimed in claim 4, wherein said unit data detector for detecting said byte-detection clock signal comprises:
    a D flip-flop for dividing said pixel clock signal supplied from said second D flip-flop of said clock selector by two to obtain a divided pixel clock signal;
    a counter for counting said divided pixel clock signal; and
    a logic circuit for logically combining said pixel clock signal, the output of said D flip-flop, the output of said counter, and said gray scale control codes from said latch portion.

6. An apparatus for converting a resolution and a gray scale of document image data as claimed in claim 1, wherein said image data converted comprises:
    a converter for carrying out multiple image binary codification of said document image data in accordance with said pixel clock signal from said clock selector;
    a D flip-flop and an inverter interconnected for processing 4-bit pixel data by processing said pixel clock signal; and a 4-bit latch for latching 4-bit pixel data in response to an output signal produced by said D flip-flop.

7. An apparatus for converting a resolution and a gray scale of document image data as claimed in claim 2, wherein said image data selector comprises a logic device for selecting the gradation of the image data of said image data converter according to said gray scale control data supplied from said 8-bit latch of said latch portion.

8. An apparatus for converting a resolution and a gray scale of document image data as claimed in claim 1, wherein said image data output circuit comprises a shift register and first and second 8-bit latches for respectively receiving said image data converted from said image data converter, thereby outputting in units of bytes image data of predetermined resolution and gray scale in selected by said image data selector.

9. An apparatus for converting resolution and gray scale of inputted digital image data from an image sensor, comprising:

image data converter means for converting inputted digital image data of a predetermined gray scale into converted digital image data of a plurality of different gray scales;

image data selector means for outputting a selector signal in response to gray scale control data and a byte clock signal, said selector signal representing selected converted digital data of one of said plurality of different gray scales;

image data output means for outputting said selected converted digital data from said image data converter means in response to said selector signal and a pixel clock signal;

clock signal generation means for generating clock signals in accordance with resolution control data representing a desired image resolution;

clock signal selection means for selecting certain of said clock signals generated by said clock signal generation means in accordance with said resolution control data to produce said pixel clock signal; and data detector means for producing said byte clock signal in response to said pixel clock signal and said gray scale control data.

* * * * *

UNITED STATES PATENT AND TRADEMARK OFFICE
CERTIFICATE OF CORRECTION

PATENT NO. : 5,274,471
DATED : December 28, 1993
INVENTOR(S) : Eun-jin Kim

It is certified that error appears in the above-identified patent and that said Letters Patent is hereby corrected as shown below:

Col. 3, line 22, "tones" should be --tones;--.

Col. 4, line 19, "binary-image" should be --binary image--.

Col. 7, line 64, "810" should be --510--.

Col. 11, line 18, delete "in".(line 9.5)

Signed and Sealed this

Twenty-fourth Day of May, 1994

Attest:

BRUCE LEHMAN

*Attesting Officer*       *Commissioner of Patents and Trademarks*